March 27, 1945.  B. M. BODDE, JR  2,372,173
PROJECTION SCREEN
Filed March 6, 1944
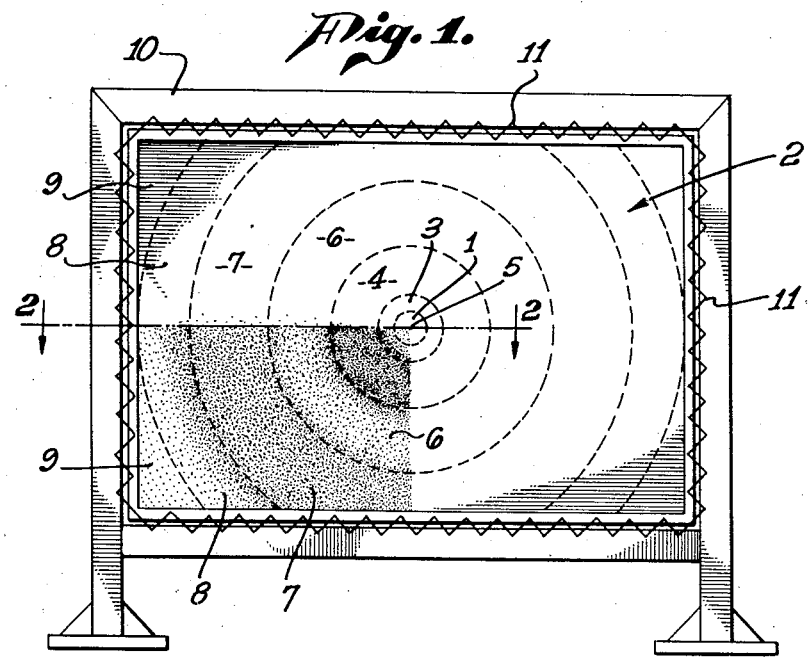
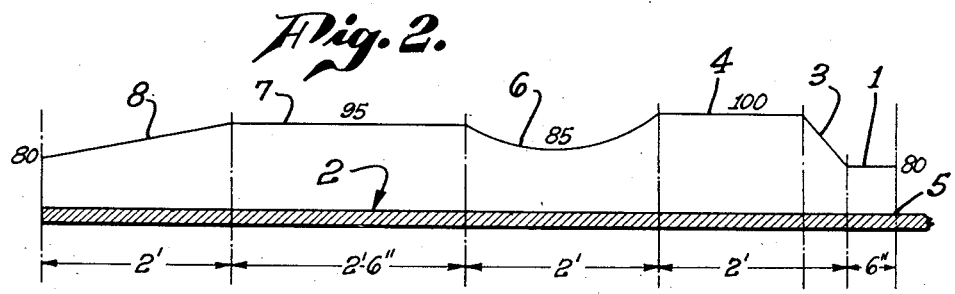
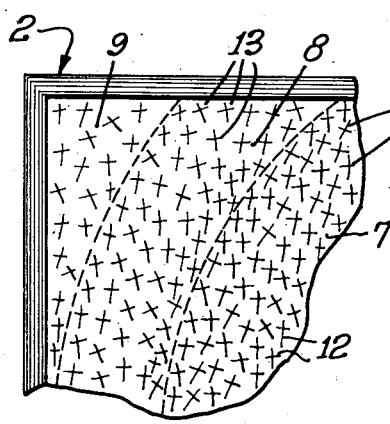
BERNARD M. BODDE, JR.,
INVENTOR.
BY W. E. Beatty
ATTORNEY.

Patented Mar. 27, 1945

2,372,173

UNITED STATES PATENT OFFICE 2,372,173

PROJECTION SCREEN

Bernard M. Bodde, Jr., Los Angeles, Calif.

Application March 6, 1944, Serial No. 525,219

4 Claims. (Cl. 88—28.93)

The invention relates to a projection screen and particularly to a screen of the translucent type suitable for the projection of still or motion pictures so that such projected pictures may be viewed or photographed on the side of the screen opposite the projector. The invention further relates to the method of preparing and correcting screens.

With the use of a projector employing a mirror type of arc light wherein the mirror is a curved surface, it has been found that such arc light produces rings of light of high intensity on the screen. An object of the invention is to overcome the abnormal intensity of light transmission at such rings and obtain substantially uniform light transmission of the projected picture throughout the area of the screen. This is accomplished by stopping the light at the screen in proportion to the intensity of the rings.

It has heretofore been proposed to overcome the central hot spot on the screen, when using a condenser type of arc light, by using either a diffusing agent, or by using a light refracting material. While such materials may be employed at the locus of the rings, preferably the unwanted light rays are stopped at the screen by employing a stack of polarizing crystals. Such crystals become oriented in the same direction if the base which carries them is stretched in that direction. This result is not desired, as random polarization is preferred. However, in the case of a large screen such as 12 feet by 18 feet, it is necessary to apply a force of the order of 50 to 75 pounds per running foot all around the edge of the screen in order to stretch it flat. In order to provide a screen having a coating thereon of a random array of polarizing crystals which are not stretched, and at the same time have a screen which is stretched flat, I prefer to obtain this condition by stretching the screen flat and then applying a crystallizable polarizing material to it so that the random area of unstretched polarizing crystals in an unstretched state is produced on a screen base which is stretched flat.

For further details of the invention reference may be made to the drawings wherein Fig. 1 is a front view in elevation of a translucent projection screen treated according to the invention.

Fig. 2 is a schematic sectional view on line 2—2 of Fig. 1 to illustrate how the base of the screen is built up to obtain substantially uniform light transmission when employing a mirror type of arc light which produces rings of light on the front of an untreated screen.

Fig. 3 is an enlarged view with parts broken away of a corner of the screen in Fig. 1.

Referring in detail to the drawing, as previously stated, the invention is particularly concerned with correcting for the rings of light projected by a mirror type of arc light not shown. A study of the light intensity at the screen from such an arc light reveals that instead of having a hot spot at the center, as one would suppose from viewing the screen, according to photometer measurements in fact there is a region of low light intensity at the center of the screen indicated by the portions of the curve marked 1 in Fig. 2, and having a relative light intensity of the order of 80. This light intensity extends over a central circle having a radius of the order of 6 inches as indicated, it being assumed that the screen 2 is about 75 feet from the projector. The light intensity then increases over a small ring indicated at 3 until a comparative light intensity of the order of 100 is reached and the band width of this light intensity is of the order of 2 feet as indicated at 4. In Fig. 2, it is assumed that the center of the screen is at 5. Moving outwardly from the center 5 and from the band 4, the light intensity decreases for a band width of about 2 feet as indicated at 6 and outwardly therefrom is a band 7 having a light intensity a little less than the band 4, the band width of the band 7 being of the order of 2½ feet. Extending outwardly from the band 7 is a region 8 where the light gradually decreases in intensity, but another band of higher light intensity is usually found in the corner of the screen as indicated at 9 in Fig. 3.

When the screen 2 is in use, it has been customary to support it in a suitable framework 10 having an elastic lacing 11 sufficient to stretch the screen 2 substantially flat. As previously stated, in the case of a screen 12 feet by 18 feet, the tension in the lacing 11 may be of the order of 50 to 75 pounds per running foot around the edge of the screen.

The screen 2 may be either a transparent sheet of plastic material such as cellulose acetate, ethyl cellulose or other plastic as disclosed in previous patents and well known. Or the screen 2 may be such a base of plastic material having a translucent coating thereon as is well known, the coating being either substantially uniform, or perhaps built up at the center to overcome the central hot spot when using a condenser lens type of arc light.

According to the present invention, to such a base or screen, assuming it is plastic, and regardless of how it is made, I added to it by spraying thereon a solution of plastic containing any of the materials before described, the added material being greatest in thickness where the light ring intensity is greatest and the amount of material applied being roughly proportional to the contour of curve 1, 3, 4, 5, 7 and 8 in Fig. 1 taking the level 80 as "0." That is, except for a ground coat over the whole screen, no material would be applied to the central portion marked 1. Then the material would be gradually increased in number of coats in accordance with the slope of the line 3 and the largest number of coats would be applied over the ring 4 as this is the ring of highest light intensity. By proceding in this manner, a substantially uniform light intensity of the projected picture is obtained on the screen 2.

If the correcting material is a diffusing agent, I may use a solution of plastic containing zinc stearate or other flattening agent. If the correcting agent is a light refracting material, I may use finely ground quartz in a solution of plastic. The plastic solution in either case may be of the same plastic as the screen itself, or at least a plastic which is compatible therewith and will fuse or adhere thereto when a solution is sprayed to form a coat on the screen.

As previously stated, the preferred type of correcting material is a crystallizable polarizing material which is applied to the screen 2 when it is stretched flat in the frame 10 or otherwise, the amount or number of coats of the correcting material being determined by the contour of the curve 1, 3, 4, etc. in Fig. 2. The result of this is to provide stacks of polarizing crystals wherein the interstices between crystal stacks become smaller in size toward the ring or corona portion of greatest light intensity. For example crystal stacks having small interstices are indicated at 12 in Fig. 3 for the ring 7 of comparatively high light intensity, whereas crystal stacks having larger interstices are shown at the outer margin of ring 8 at 13 where the light intensity is lower.

To prepare the coating of this invention, preferably I take a solution of plastic material, viz. the same material used to make the base of screen 2 and mix therewith a solution of material adapted to crystallize to form microscopic crystals adapted to polarize light, and spray the resulting coating solution on the base 2, whereby a random orientation of the microscopic crystals is obtained when the crystals form in situ on the base 2. This results in random polarization of light passing through the screen. Preferably I prepare this polarizing solution in approximately the following manner and proportions. To six grams of quinine bisulphate, or other members of the quinine family, add 200 cc. of butyl alcohol, heat and stir to dissolve the quinine until it becomes viscous or thick like molasses. While it is hot, add thereto about an equal quantity of approximately two grams of iodine sulphate dissolved in 40 cc. of ethyl alcohol, mix and allow to cool and the mass will become of the consistency of gelatine. The iodine delays the crystallization of the quinine. Then take 1 per cent or 2 per cent of the gelatine-like mix and add to 99 per cent or 98 per cent of the screen material such as ethyl cellulose, or cellulose acetate dissolved in a solvent, mix thoroughly and spray this coating material with a spray onto the base 2. Preferably the coating material which is described is first uniformly sprayed on the base 1, very thin, for example to a thickness of .0001 inch. Then gradually increase the thickness of the coating as the light rings on the screen are approached.

As the polarized coating material is largely composed of the same material as the base 2, this coating integrally unites with the screen to form a coating which is flexible like the base 2, and this coating is transparent.

On examining the coating thus produced, under a microscope with magnification of about 700, the quinine crystals look like telephone poles, and their arrangement is entirely random, that is, like a jumbled mass of telephone poles indicated at 12 and 13 in Fig. 3, with the thickness of the pile of telephone poles or microscopic crystals increasing and the interstices decreasing where the most coats are used. However, the proportions above indicated are such that the crystals are separated so that light can pass between them without being polarized, such interstices decreasing in size as the thickness of the crystal pile increases towards the locus of the light rings on the screen. However, the light that strikes a crystal at the bottom of the pile is polarized in one direction and such light, on striking a crystal above it which lies at an angle thereto, can pass through the upper crystal in an amount depending upon the angle between the two crystals. If they are at right angles to each other, no light will pass where the upper crystal intersects the light from the lower crystal. The areas in which the light is transmitted through the coating are very small in comparison to the size of the magnified silver grain of the picture as it appears on the screen and hence whatever appearance of grain may be in the projected picture is not increased by reason of the use of this coating.

I claim:

1. The method of modifying light transmission through a translucent screen stretched substantially flat when in use by means of crystalline polarizing material which is substantially unstretched, which comprises stretching the screen substantially flat, then applying concentric rings of a crystallizable polarizing material to the stretched screen, and producing random crystallization of said material on the stretched screen.

2. The method of correcting the light transmission through a flexible translucent screen of plastic material from a projector having a mirror type arc light wherein said arc light produces rings of light on said screen, said method comprising stretching said screen substantially flat, spraying on said screen, where said rings appear, multiple coats of plastic material containing a solution of crystallizable polarizing material, permitting said coats to dry with random formation of the crystals of said material, while the screen is stretched substantially flat, the number of said coats being in proportion to the light intensity of said rings.

3. A flexible translucent screen of plastic material adapted for use with a mirror type arc light producing rings of light, means for stretching said screen substntially flat, said screen having light reducing material where said rings appear, said light reducing material comprising substantially unstretched random stacks of polarizing crystals embedded in said screen, the interstices between the crystal stacks becoming smaller in size towards the light ring portion of greatest light intensity.

4. A flexible translucent screen of plastic material comprising a stretched screen body having an unstretched random array of polarizing crystals embedded in said screen in concentric rings.

BERNARD M. BODDE, Jr.